United States Patent [19]
Bergeon et al.

[11] Patent Number: 4,787,055
[45] Date of Patent: Nov. 22, 1988

[54] CIRCUIT FOR CALCULATING THE DISCRETE FOURIER TRANSFORM

[75] Inventors: Gérard Bergeon, Maison Alfort; Claude Legendre, Paris; Marc Muller, Meudon; Philippe Cros, Paris; Jean-Louis Lemaire, Montrouge, all of France

[73] Assignee: Thomson-CSF, Paris, France

[21] Appl. No.: 755,278

[22] Filed: Jul. 15, 1985

[30] Foreign Application Priority Data

Jul. 20, 1984 [FR] France ............... 84 11541

[51] Int. Cl.⁴ .................................. G06F 7/34
[52] U.S. Cl. .................................... 364/726
[58] Field of Search ................... 364/726, 728

[56] References Cited

U.S. PATENT DOCUMENTS

| | | | |
|---|---|---|---|
| 3,875,391 | 4/1975 | Shapiro et al. | 364/736 |
| 4,393,457 | 7/1983 | New | 364/726 |
| 4,435,774 | 3/1984 | Claasen et al. | 364/726 |
| 4,547,862 | 10/1985 | McIver et al. | 364/726 |
| 4,563,750 | 1/1986 | Clarke | 364/726 |

FOREIGN PATENT DOCUMENTS

| | | | |
|---|---|---|---|
| 0083967 | 11/1983 | European Pat. Off. | 364/726 |
| 58-205281 | 5/1982 | Japan . | |
| 59-81762 | 5/1984 | Japan . | |

Primary Examiner—Gary V. Harkcom
Assistant Examiner—Long T. Nguyen
Attorney, Agent, or Firm—Roland Plottel

[57] ABSTRACT

A circuit for calculating the discrete Fourier transform which includes a multiplier, two adders for effecting the calculation of the discrete Fourier transform while describing a butterfly data path, and address processors which supply the multiplier and adders with continuous data under the control of a synchronization clock. To accelerate the calculations, the processor has a memory for reducing the data access time. This memory is divided into two parts, each of which alternately plays the role of calculation memory and input/output memory for the transfer of data with a memory external to the processor.

17 Claims, 9 Drawing Sheets

FIG_1

FIG_2

FIG_3

FIG_4

FIG_5

FIG_7

FIG_8

FIG_9

FIG.10

CIRCUIT FOR CALCULATING THE DISCRETE FOURIER TRANSFORM

BACKGROUND OF THE INVENTION

The invention relates principally to an electronic circuit more especially a circuit capable of working out the discrete Fourier transform calculation.

The Fourier transform is an extremely powerful mathematical tool used more especially for calculating spectra.

The Fourier transform allows the convolution product more particularly to be calculated. In fact, the Fourier transform of the convolution product of two functions is equal to the Fourier transform product of these two functions. Thus, at each point the convolution product of the two functions is equal to the inverse Fourier transform of the product of the Fourier transforms of these two functions.

It is often advantageous to weight a function whose Fourier transform it is desired to calculate. The device of the present invention allows the weighting to be carried out, on order, for example before calculating the Fourier transform. For a discrete succession, weighting is effected by multiplying the terms of the succession by weighting coefficients stored for example in a read only memory (ROM). Advantageously, the ROM contains several sets of coefficients so that the desired weighting may be chosen.

DESCRIPTION OF THE PRIOR ART

The European patent application published under the n° 0083967 describes an integrated circuit for calculating the DFT by time decimation. This circuit allows the DFT to be calculated over 32 points. It uses an accumulator multiplier limiting the dynamics of the calculation. The calculating time required by the circuit described in said application is increased by almost 36% by the time required for the data exchanges. Thus, the data exchanges use more than 25% of the total calculating time. Furthermore, the European patent application published under n° 0083967 describes an association of integrated circuits capable of calculating the DFTs for a number of points equal to a multiple of 32. Such an association requires monitoring of data transfers by an external logic as well as recalculation of the coefficients of the DFT.

The device of the invention overcomes the drawbacks of the prior art. The device of the present invention allows a DFT to be calculated independently over any number of points. In order to conserve the dynamics, if required, a multiplier and separate adders and a floating point are used. A memory split into two allows one part to be allocated to the calculations, while the other part of the memory simultaneously takes over the data exchanges.

SUMMARY OF THE INVENTION

The circuit of the present invention works out, for a succession of numbers, the numerical calculation called discrete Fourier transform, called DFT in the rest of this patent. For each time, the values of the DFT are substantially equal to the value of the Fourier transform.

Let f be a succession of numbers $f_n$, n being the rank of the number $f_n$ in the succession f.

The succession f is for example the succession of N numerical values of a function which has been sampled. $F_k$, the DFT of $f_n$ is defined by:

$$F_k = \sum_{n=0}^{N-1} f_n W^{nk} \text{ with } W = e^{-j(2\pi/N)}$$

The device of the invention proposes breaking down a complex calculation into series of simple calculations. For that, the device of the invention uses a butterfly structure illustrated in FIG. 1.

The DFT calculation algorithm is that of time decimation:

If N is even, the succession f may be broken down into a succession g of the even coefficient terms of f and into a succession h of the terms of the uneven coefficient succession f. For $0 \leq L \leq N/2 - 1$ $$g_L = f_{2L}$$

$$h_L = f_{2L+1}$$

Let $G_k$ and $H_k$ be the DFT respectively of $g_L$ and $h_L$ $$G_k = \sum_{L=0}^{L=\frac{N}{2}-1} g_L(W^2)^{Lk}$$

$$H_k = \sum_{L=0}^{L=\frac{N}{2}-1} h_L(W^2)^{Lk}$$

So $$F_k = \begin{cases} G_k + W^k H_k & \text{for } 0 \leq k \leq \frac{N}{2} - 1 \\ G_{k-N/2} + W^k H_{k-N/2} & \text{for } \frac{N}{2} \leq k \leq N - 1 \end{cases}$$

More particularly for two indices whose difference is equal to N/2, we have:

$$W^{m+N/2} = -W^m$$

$$F_m = G_m + W^m H_m$$

and $$F_{m+N/2} = G_m + W^{m+N/2} H_m = G_m - W^m H_m$$

The aim of the invention is mainly to provide a circuit for calculating the discrete Fourier transform comprising, a multiplier and two adders, said circuit breaking down the calculation of the Fourier transform over N points into a succession of independent calculations of the Fourier transforms over groups of $N_i$ terms, $N > N_i$, comprising an address processor capable of allowing continuous data streams (MDSI) to be supplied to said processor.

BRIEF DESCRIPTION OF THE DRAWINGS

The invention will be better understood from the following description and accompanying Figures given by way of non limiting examples in which:

In FIGS. 1 to 11 the same references designate the same elements.

In FIGS. 1 to 11 the direction of the data streams is indicated by arrows.

DESCRIPTION OF THE PREFERRED EMBODIMENTS

Figure 1:
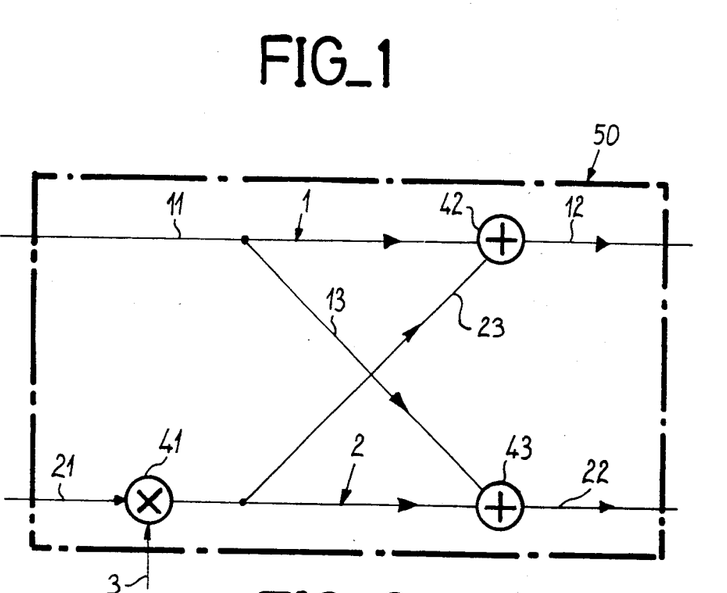
FIG. 1 illustrates a computing cycle called DFT butterfly for real numbers.

In FIG. 1 can be seen a general diagram of a DFT butterfly 50 using the algorithm of time decimation. The butterfly 50 comprises a first line 1, with an input 11 and an output 12 and a second line 2, with an input 21 and an output 22. Line 1 comprises an adder 42. Line 2 comprises a multiplier 41 followed by an adder 43. The inputs of multiplier 41 are connected to the input 21 of line 2 and to a line 3. The inputs of adder 42 are connected to line 1 and to line 2 at the output of multiplier 41 by a line 23. The inputs of adder 43 are connected to line 2 at the output of multiplier 41 and to line 1 upstream of adder 42 by line 13.

The butterfly 50 illustrated in FIG. 1 is particularly well suited for the time decimation calculation in terms of the DFT of successions of real numbers. Time decimation assumes that at the inputs 11 and 21 of butterfly 50 the terms of the succession g and h are present. On the other hand at the outputs 12 and 22 of butterfly 50 we find the ordered terms of the succession F. The following table gives the correspondance of the input and output indices for a DFT comprising eight terms. That of the indices is related by the relationship called "bit reverse" for the high weight figures and the low weight figures are permuted in the binary writing of these indices.

TABLE 1

| INPUT INDEX | | OUTPUT INDEX | |
|---|---|---|---|
| Decimal | Binary | Decimal | Binary |
| 0 | 000 | 000 | 0 |
| 4 | 100 | 001 | 1 |
| 2 | 010 | 010 | 2 |
| 6 | 110 | 011 | 3 |
| 1 | 001 | 100 | 4 |
| 5 | 101 | 101 | 5 |
| 3 | 011 | 110 | 6 |
| 7 | 111 | 111 | 7 |

Figure 2:
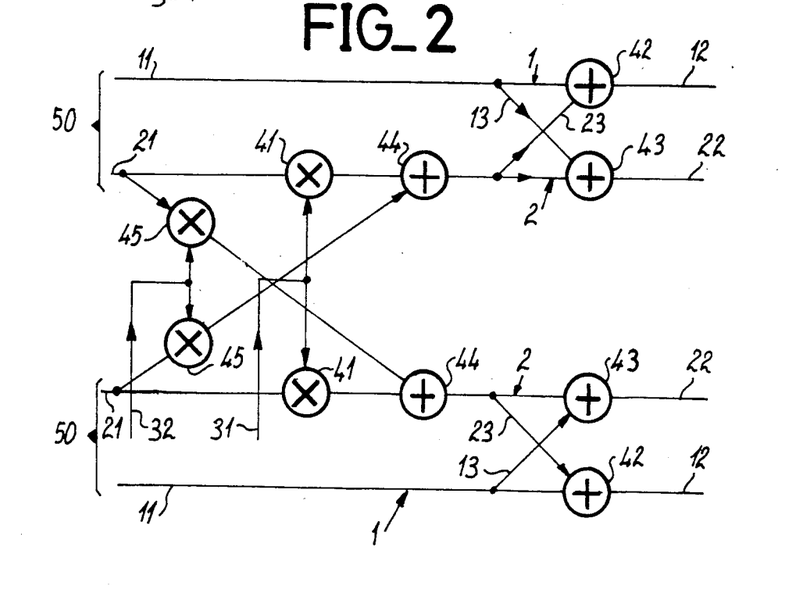
FIG. 2 illustrates a DFT butterfly for complex numbers.

In FIG. 2 is shown an assembly of two butterflies 50 capable of working out the DFT calculation on successions of complex numbers. Each of the butterflies 50 comprises an adder 44 one of whose inputs is connected to the output of multipliers 41. The other input of said adders 44 is connected via multipliers 45 to the inputs 21 of complementary butterflies. Furthermore, the inputs of multipliers 45 are connected to a line 32. The inputs of multipliers 41 are connected to a line 31. Lines 31 and 32 correspond to line 3 in FIG. 1.

Figure 3:
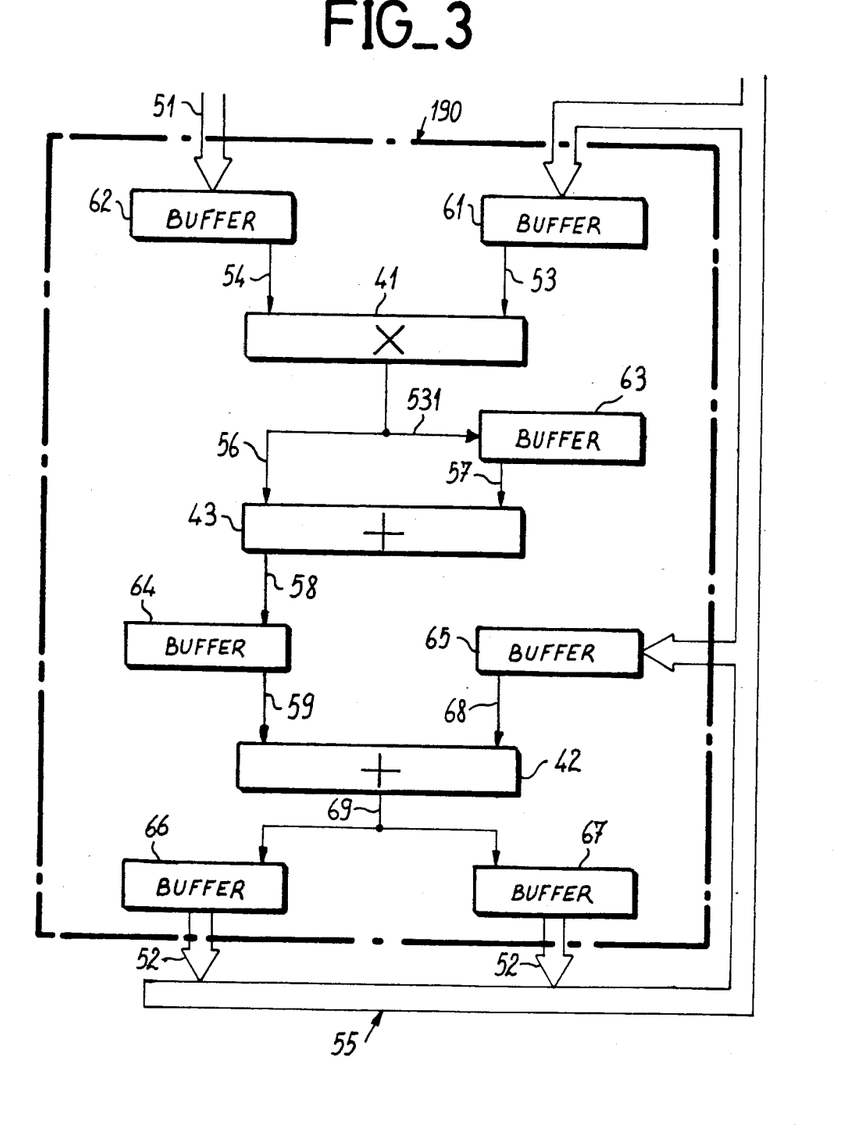
FIG. 3 illustrates the data path for calculating the discrete Fourier transform in one embodiment of a processor according to the invention.

In FIG. 3 can be seen the data path for calculating the DFT in an example of a processor according to the invention. Device 190 of FIGS. 3, 4 and 5 comprises the multiplier 41, the adders 42 and 43 are well as buffer memories 61 to 67. The buffer memories 61 to 67 ensure the delay by a clock cycle required for synchronizing the pipe line structure of the process of the invention as well as a resynchronization with respect to the clock pulses. A data bus 55 connects device 190 of FIGS. 3, 4 and 5 to a memory not shown. The input of buffer memory 61 is connected to bus 55. The input of the buffer memory 62 is connected by bus 51 to a DFT coefficient memory, not shown. The outputs of buffer memories 61 and 62 are connected to the inputs of multiplier 41 respectively by lines 53 and 54. The output of multiplier 41 is connected on the one hand by a line 531 to the buffer memory 63 and on the other hand by a line 56 to an input of adder 43. The output of buffer memory 63 is connected to the other input of adder 43 by a line 57. The output of adder 43 is connected to the input of the buffer memory 64 by a line 58. The output of buffer memory 64 is connected to an input of adder 42 by a line 59. The input of buffer memory 65 is connected to bus 55. The output of the buffer memory 65 is connected to the other input of adder 42 by a line 68. The output of adder 42 is connected to the inputs of buffer memories 66 and 67 by a line 69. The outputs 52 of buffer memories 66 and 67 are connected to the bus 55.

Figure 4:
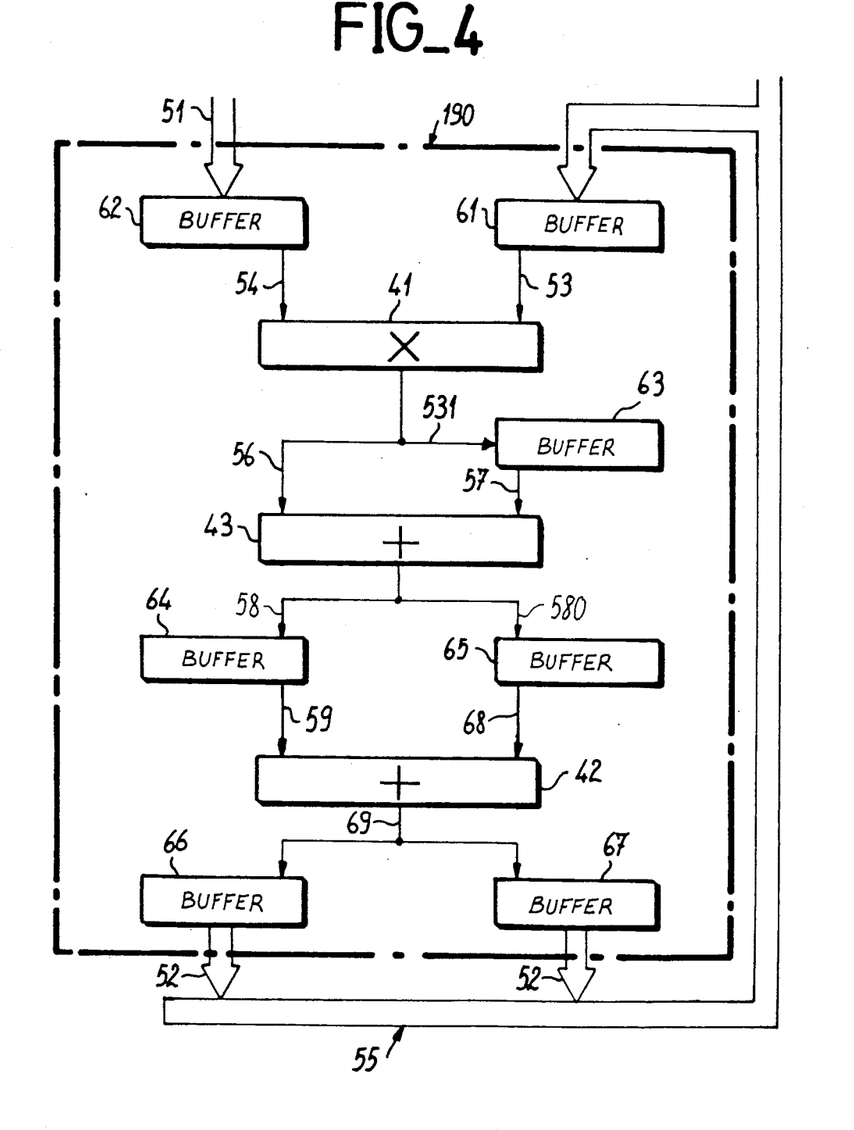
FIG. 4 illustrates a data path for calculating the weighting in an example of a processor according to the invention.

In FIG. 4 can be seen the data path for calculating the weighting in an example of a processor according to the invention. The input of buffer memory 61 is connected to bus 55. The input of buffer memory 62 is connected by a bus 51 to a DFT coefficient memory, not shown. The outputs of buffer memory 61 and 62 are connected to the inputs of multiplier 41 respectively by lines 53 and 54. The output of multiplier 42 is connected on the one hand by line 531 to a buffer memory 63 and on the other hand by line 56 to an input of adder 43. The output of the buffer memory 63 is connected to the other input of adder 43 by line 57. The output of adder 43 is connected on the one hand to the input of buffer memory 65 by line 580 and on the other hand to the input of buffer memory 64 by a line 58. The output of buffer memory 65 is connected to an input of adder 42 by line 68. The output of buffer memory 64 is connected to the other end of adder 42 by a line 59. The output of adder 42 is connected to the inputs of buffer memories 66 and 67 by the line 69. The outputs 52 of buffer memory 66 and 67 are connected to bus 55.

Figure 5:
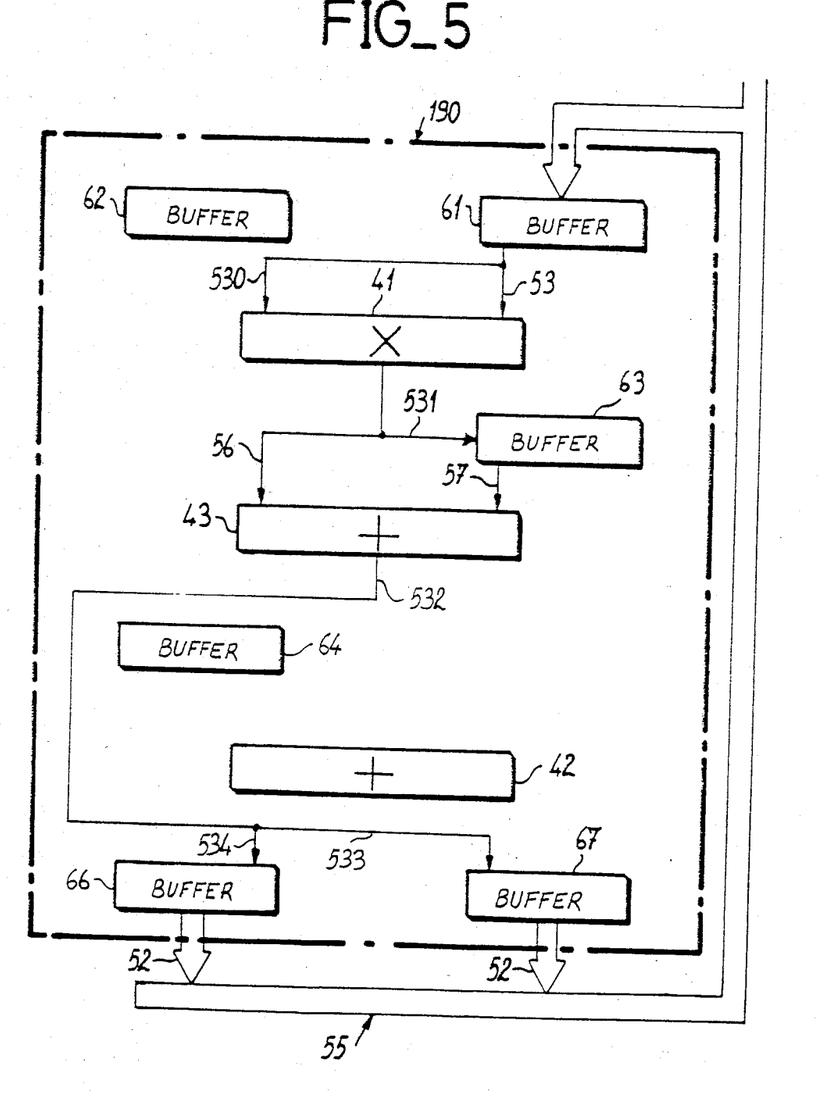
FIG. 5 illustrates a data path for calculating the modulus of an example of a processor according to the invention.

In FIG. 5 is shown the data path for calculating the modulus in an example of a processor 190 according to the invention. The buffer memories 62 and 64 as well as adder 42 of device 190 are not connected for calculating the modulus. The input of buffer memory 61 is connected to bus 55. The output of buffer memory 61 is connected to a first input of multiplier 41 by a line 53 and to a second input of multiplier 41 by a line 530. The output of multiplier 41 is connected on the one hand to the input of buffer memory 63 by a line 531 and on the other to an input of adder 43 by line 56. The output of the buffer memory 63 is connected to the other input of adder 43 by line 57. The output of adder 43 is connected to the inputs of buffers memories 66 and 67 respectively by lines 534 and 533. The outputs 52 of the buffer memory 66 and 67 are connected to bus 55.

Figure 6:
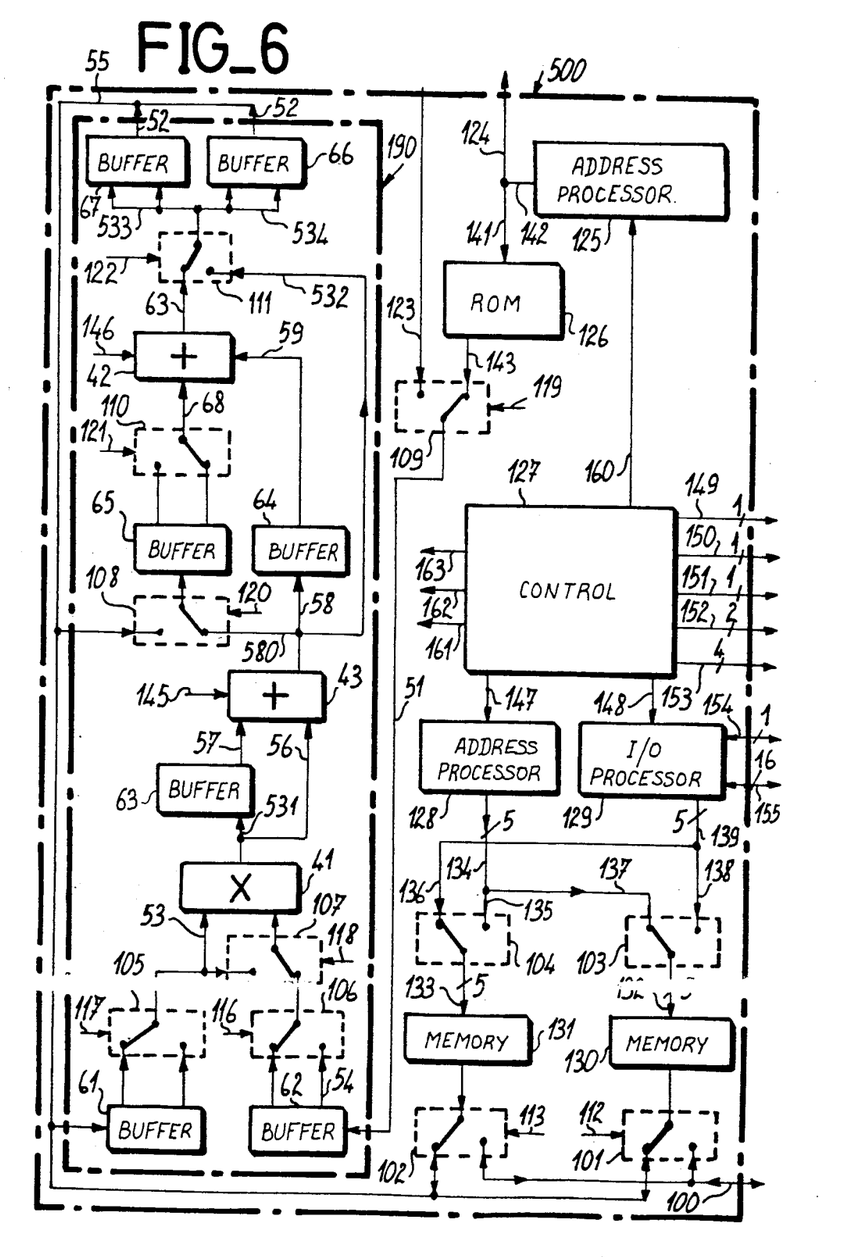
FIG. 6 illustrates one circuit embodiment of the invention.

In FIG. 6 can be seen a particularly well performing embodiment of processor 500 for calculating the DFT in accordance with the invention. Processor 500 allows calculation of the DFT, of weighting followed by the DFT calculation or calculation of the modulus to be chosen. It will be obvious to a man skilled in the art to construct a processor, according to the teaching contained in this patent, which first of all executes the correlations, the DFT followed by a weighting calculation. The processor 500 comprises a device 190 of FIGS. 3, 4 and 5, two random access memories 130 and 131 (RAM), an input-output processor 129, an address calculating processor 128 for memories 130 and 131, a coefficient store 126 associated with an address processor 125 as well as a logic circuit 127 for controlling processor 500. The presence of memories internal to the processor 500 as well as the address and input-output processor thereof increases the processing speed of the processor. The desired data paths in processor 500 are chosen through switches 101, 102, 103, 104, 105, 106, 107, 108, 109, 110 and 111 controlled respectively by signals 112, 113, 114, 115, 116, 117, 118, 119, 120, 121 and 122. The signals for controlling the switches are outputted by the control unit 127 over line 161.

Device 190, and switch 105 and 106 allows the outputs of the buffer memories 61 and 62 to be chosen The output of switch 106 is connected to switch 107 for choosing at one of the inputs of multiplier 41 between the output of memory 62 and that of memory 61. Switch 108 allows the input of buffer memory 65 to be connected either to bus 55 or to the output of adder 43. Switch 110 allows one of the two outputs of buffer memory 65 to be chosen. Switch 111 allows the information present at the output of adder 42 to be fed to the buffer memory 66 or 67.

In the embodiment shown in FIG. 6, memories 130 and 131 are of reduced size. Thus, a data bus 100 connects them to an external memory not shown. In this latter memory is stored the succession whose DFT it is desired to calculate. Switches 101 and 102 allow a choice to be made between writing of the data from bus 100 or reading out of the store and feeding data over the bus 55 of memories respectively 130 and 131. Switch 101 receives a control signal 112 and switch 102 a control signal 113. Memories 130 and 131 comprise respectively an address bus 132 and 133. In the embodiment shown in FIG. 6, the applicant has used address buses of five bits corresponding to the capacity of memories 130 and 131. The address buses 132 and 133 are connected to the input-output processor 129 in the writing modes or to the address processor 128 in the reading mode. The selection is provided by memories 130 and 131 respectively by means of switches 103 and 104 which receive respectively the control signals 114 and 115. The input-output processor 129 is connected to the switch first of all by a line 139 itself connected to switch 103 by a line 138 and to the switch 104 by a line 136. The address processor 128 is connected to switches 103 and 104 respectively by lines 137 and 135 connected to line 134. The input-output processor 129 is connected by line 155 to the external memory not shown, to which it sends for example over sixteen bits the address to be read out from said external memory.

In the reading mode, memories 130 and 131 are connected to the data bus 55 so as to supply to device 190 the data to be processed.

Memory 126 contains the coefficients W of the DFT. It is connected to bus 51 through line 143 and switch 109. The address processor 125 of memory 126 is connected to its address bus 141 by a line 142. Memory 126 is for example a read only memory (ROM) or a programmable read only memory (ROM).

Advantageously, the device of the invention allows the coefficient W of the DFT to be changed. The additional sets of coefficients are stored in a memory external to processor 500. The address processor 125 allows this memory to be addressed over line 142 and bus 124. The data of this memory are present on bus 123 which is connected to bus 51 through switch 109. The input-output processor 129 is connected to an external input-output clock. All the clocks internal to processor 500 are synchronized by the control device 127 by means of line 162. Depending on the type of calculation to be worked out, adders 43 and 42 must work out additions or subtractions. Switching between these two functions is provided by signals 145 and 146 received from the control device 127 over line 163. The number N of the term in the succession f whose DFT it is desired to calculate is given by line 153. The order to effect weighting is given to the control device 127 by line 152 for example over 1 bit. The order to calculate the modulus is given to the control device 127 by line 151 for example over 1 bit. The order to begin calculation is given to the control device 127 by line 150 for example over a line transmitting one bit. The end of calculation is signalled by control device 127 over line 49 for example over 1 bit. So as not to clutter up the Figure lines 161, 162 and 163 have not been shown.

Memory 126 comprises the coefficients w of the DFT which are for example the $N^{th}$ roots of unity. In fact, for all the calculations it is the coefficient belonging to the interval $[0,\pi]$ which is required. In a variant of construction, memory 126 only contains the coefficients belonging to the interval $[0, \pi/4]$; the other coefficients being derived by conventional trigonometrical rules. Memory 126 contains the coefficient of the DFT of maximum size which it is desired to calculate, for example 4096; the coefficient of a DFT of smaller size forms a sub assembly of the coefficients of the DFT of maximum size.

The address processor 125 addresses the coefficient of a DFT of smaller size by using the most significant bits (MSB) of the address of the coefficient of the DFT of maximum size. The number of address bits is an increasing function of the number of points of the DFT.

In one embodiment, the multiplier 41 is a multiplier operating on fixed format data for example of 16 bits comprising eight stages.

In the second embodiment providing floating point format number multiplication the multiplier comprises a circuit for processing the exponent supplying the exponent of the result.

In the third embodiment multiplier 41 comprises a device for giving respective significance to the bits in the case where the format is not standardized.

Adders 43 and 42 process floating point format operands with six bits of exponent and eighteen bits of mantissa. Advantageously, the adders comprise three pipe line stages comprising a denormalization stage, an adder stage and a renormalization stage.

As is shown by formula 1, calculation of a DFT by the device of the invention consists in subdividing into independent groups of reduced size while still executing the DFT butterflies of FIG. 1 or 2. The number of these butterflies in a group is therefore fixed by the size of the input data table. For example, a DFT of 32 terms requires two steps: a first one with four groups of eight terms are a second one with eight groups of four terms. Thus, the four data tables of eight terms then the eight data tables of four terms are successively transferred one by one into memories 130 and 131. Once the calculation has been worked out, the resulting tables are transferred into the external memory not shown at the same addresses as the input tables. It is then said that the calculation takes place "in position". The internal calculating memory is divided into two blocks 130 and 131 playing alternately the role of the input-output memories and that of the calculating memory. Advantageously, bus 100 has a capacity for accessing complex data. As an example of the elementary operation requiring for real multiplications and six real additions, the memory, for example 130, will provide complex data to device 190 and will also receive two complex data, the coefficients coming for example from memory 126. The following tables give the breakdowns for calculating the DFT between eight terms and 32768 terms.

TABLE II

| N | Group | Number of steps |
|---|---|---|
| 8 | 8 | 1 |
| 16 | 16 | 1 |
| 32 | 32 | 1 |
| 64 | 8 × 8 | 2 |
| 128 | 8 × 16 | 2 |
| 256 | 16 × 16 | 2 |
| 512 | 16 × 32 | 2 |
| 1024 | 32 × 32 | 2 |
| 2048 | 8 × 16 × 16 | 3 |
| 4096 | 16 × 16 × 16 | 3 |
| 8192 | 16 × 16 × 32 | 3 |
| 16384 | 16 × 32 × 32 | 3 |
| 32768 | 32 × 32 × 32 | 3 |

The memory, for example 130, therefore stores either:
four tables of eight terms;
or two tables of sixteen terms;
or a table of thirty-two terms.

In the general case, the external memory not shown contains R tables of N terms. At the end of calculation of a DFT of N terms, the processor 129 passes to the next table.

Figure 7:
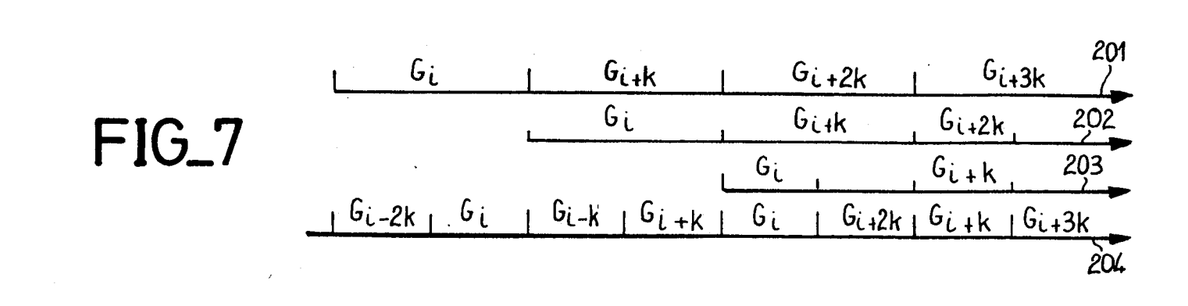
FIG. 7 illustrates the address sequence of the different steps of the DFT processing of or by the processor of the invention.

FIG. 7 shows the address sequences required for the different steps of the DFT processing by processor 500. It can be seen in table II that a DFT of N terms may be broken down for example into three steps comprising groups of N1, N2, N3, such as $N = N_1 \times N_2 \times N_3$. In one embodiment, an address sequence $G_1$ comprise the juxtaposition of three numbers C1, C2 and C3 of length respectively $Log_2 N_1$, $Log_2 N_2$, $Log_2 N_3$. Processor 129 supplies to the external memory the address of the input data of the group to be executed. For calculating the group of size $N_1$, C1 and C2 are caused to vary with C3 remaining constant. For calculating the group of size $N_2$, C2, and C1 are caused to vary with C3 remaining constant.

For calculating the group of size $N_3$, C3 and C1 are varied and C2 remains constant.

An address example supplied by a processor 129 to the external memory of size $N_1$ is given by table III.

TABLE III

| $C_1$ | | | $C_2$ | | | $C_3$ | |
|---|---|---|---|---|---|---|---|
| $2^8$ | $2^7$ | $2^6$ | $2^5$ | $2^4$ | $2^3$ | $2^2$ | $2^1$ | $2^0$ |
| 256 | 128 | 64 | 32 | 16 | 8 | 4 | 2 | 1 |
| 0 | 0 | 0 | 0 | 1 | 1 | 0 | 1 | 0 |
| 0 | 0 | 0 | 0 | 1 | 1 | 0 | 1 | 0 |
| 0 | 0 | 1 | 0 | 1 | 1 | 0 | 1 | 0 |
| 0 | 1 | 0 | 0 | 1 | 1 | 0 | 1 | 0 |
| 0 | 1 | 1 | 0 | 1 | 1 | 0 | 1 | 0 |
| 1 | 0 | 0 | 0 | 1 | 1 | 0 | 1 | 0 |
| 1 | 0 | 1 | 0 | 1 | 1 | 0 | 1 | 0 |
| 1 | 1 | 0 | 0 | 1 | 1 | 0 | 1 | 0 |
| 1 | 1 | 1 | 0 | 1 | 1 | 0 | 1 | 0 |

With the calculation being executed "in position" the processor 129 therefore supplies the output addresses, these addresses are however shifted in time with respect to the input addresses.

TABLE IV

| Inputs-Outputs | | | | Internal Memory | | | |
|---|---|---|---|---|---|---|---|
| Input Succession Stage | Implantation | Succession | 1st stage | Succession | 2nd Stage | Succession | 3rd |
| 0 | 0 | 0 | 000 | 0 | 000 | 0 | 000 |
| 1024 | 1 | 1 | 001 | 2 | 010 | 4 | 100 |
| 512 | 2 | 2 | 010 | 4 | 100 | 1 | 001 |
| 1536 | 3 | 3 | 011 | 6 | 110 | 5 | 101 |
| 256 | 4 | 4 | 100 | 1 | 001 | 2 | 010 |
| 1280 | 5 | 5 | 101 | 3 | 011 | 6 | 110 |
| 768 | 6 | 6 | 110 | 5 | 101 | 3 | 011 |
| 1792 | 7 | 7 | 111 | 7 | 111 | 7 | 111 |

In the embodiment shown in FIG. 6, the weighting coefficients are contained in a memory external to processor 500. The address processor 125 calculates these coefficients and transmits over line 142 to bus 124. The coefficients obtained are fed to the external memory not shown by the data bus 123 to bus 51. Since each term whose DFT it is desired to calculate must be multiplied by a coefficient of the same index in one embodiment, calculation of the coefficients is carried out by a binary counter. The coefficients are sequentially present on bus 123.

In another embodiment, the weighting coefficients are symmetrical with respect to the terms of index N/2. In this case it is possible that memory 126 does not contain N/2 of the first coefficient of the weighting law. In this case, a device transforming the address bits from the coefficient of rank N/2 is associated with the address bus 141 of memory 126.

In what follows an example of addressing organization by processor 125 of memory 126 will be given, it of course being understood that other types of addressing organization come within the scope of the present invention. For example, memory 126 may contain, arranged sequentially following each other, all the successions of coefficients required for carrying out the desired Fourier transform calculations. In this case, the address processor 125 will comprise a binary counter which will add, at each clock cycle, a bit to the address of the beginning of the sequence.

Advantageously, the size of memory 126 may be limited by storing the coefficient sequences required for DFT calculation only once and addressing them as many times as required for working out the calculation. In this case, the address comprises two parts, a first part called hereafter basic sequence, depending solely on the calculated size of the DFT group and a second part called hereafter index comprising the physical address inside the memory 126 of the coefficient. An example of basic sequence addressing is given by tables V, VI and VII. Table V corresponds to a table for calculating the eight terms, table VI to a table for calculating sixteen terms and table VII to a table calculating thirty two terms. In one embodiment, the index is obtained by causing a binary mass to correspond to each step and multiplying bit by bit for the bits of the same weight the value of the mass for the value of the binary counter. An example of such a basic sequence for the size $N_1=16$ of the DFT table is given by table VIII.

TABLE V

| Butterfly stage | $N_{i=8}$ | | |
|---|---|---|---|
| | 0 | 1 | 2 |
| 0 | 0 | 0 | 0 |
| 1 | 0 | 0 | N/8 |
| 2 | 0 | N/4 | 2N/8 |
| 3 | 0 | N/4 | 3N/8 |

TABLE VI

| Butterfly stage | $N_{i=16}$ | | | |
|---|---|---|---|---|
| | 0 | 1 | 2 | 3 |
| 0 | 0 | 0 | 0 | 0 |
| 1 | 0 | 0 | 0 | N/16 |
| 2 | 0 | 0 | N/8 | 2N/16 |
| 3 | 0 | 0 | N/8 | 3N/16 |
| 4 | 0 | N/4 | 2N/8 | 4N/16 |
| 5 | 0 | N/4 | 2N/8 | 5N/16 |
| 6 | 0 | N/4 | 3N/8 | 6N/16 |
| 7 | 0 | N/4 | 2N/8 | 7N/16 |

TABLE VII

| Butterfly stage | $N_{i=32}$ | | | | |
|---|---|---|---|---|---|
| | 0 | 1 | 2 | 3 | 4 |
| 0 | 0 | 0 | 0 | 0 | 0 |
| 1 | 0 | 0 | 0 | 0 | N/32 |
| 2 | 0 | 0 | 0 | N/16 | 2N/32 |
| 3 | 0 | 0 | 0 | N/16 | 3N/32 |
| 4 | 0 | 0 | N/8 | 2N/16 | 4N/32 |
| 5 | 0 | 0 | N/8 | 2N/16 | 5N/32 |
| 6 | 0 | 0 | N/8 | 3N/16 | 6N/32 |
| 7 | 0 | 0 | N/8 | 3N/16 | 7N/32 |
| 8 | 0 | N/4 | 2N/8 | 4N/16 | 8N/32 |
| 9 | 0 | N/4 | 2N/8 | 4N/16 | 9N/32 |
| 10 | 0 | N/4 | 2N/8 | 5N/16 | 10N/32 |
| 11 | 0 | N/4 | 2N/8 | 5N/16 | 11N/32 |
| 12 | 0 | N/4 | 3N/8 | 6/N16 | 12N/32 |
| 13 | 0 | N/4 | 3N/8 | 6N/16 | 13N/32 |
| 14 | 0 | N/4 | 3N/8 | 7N/16 | 14N/32 |
| 15 | 0 | N/4 | 3N/8 | 7N/16 | 15N/32 |

TABLE VIII

| COUNTER STAGE | $N_{i=16}$ MASK | | | |
|---|---|---|---|---|
| | 0 | 1 | 2 | 3 |
| | 000 | 100 | 110 | 111 |
| 000 | 000 | 000 | 000 | 000 |
| 001 | 000 | 000 | 000 | 001 |
| 010 | 000 | 000 | 010 | 010 |
| 011 | 000 | 000 | 010 | 011 |
| 100 | 000 | 100 | 100 | 100 |
| 101 | 000 | 100 | 100 | 101 |
| 110 | 000 | 100 | 110 | 110 |
| 111 | 000 | 100 | 110 | 111 |

If memory 126 only contains the coefficients of the interval $[0, \pi/4]$, a decoder not shown in FIG. 6 is inserted before memory 126, this decoder ensuring addressing of memory 126 as well as addressing of device 190 for changing sign in accordance with trigonometrical formulae for going over from interval $[(0, \pi/4)]$ to the interval $[(0, \pi)]$.

In FIG. 7, the variation in time of the address sequences can be seen. Curve 201 shows the variations in time of the transfer address sequences $G_i$ between the external memory and the internal memory. Curve 202 shows the evolution in time of the address sequences of the group, processing of which is carried out. Curve 203 represents the evolution in time of the address sequences $G_i$ of the internal memory-external memory transfers. Curve 204 shows the address sequences which the processor 129 of FIG. 6 must calculate. Thus, in the example starting from $G_i$ and where $k=1$, the sequence $G_i, G_i+2, G_i+1, G_i+3, G_i+2, G_i+4$, etc ... k is equal to the number of terms of the partial succession multiplied by the number of terms of the group of the step in progress. One example of the implantations for calculating a group of eight terms comprising successively three steps of four butterflies of FIG. 1 is given by table IV. The succession of the first step is sequential, at the beginning of each of the following steps a leftward circular shift of log 2 (size of the group) is effected.

Figure 8:
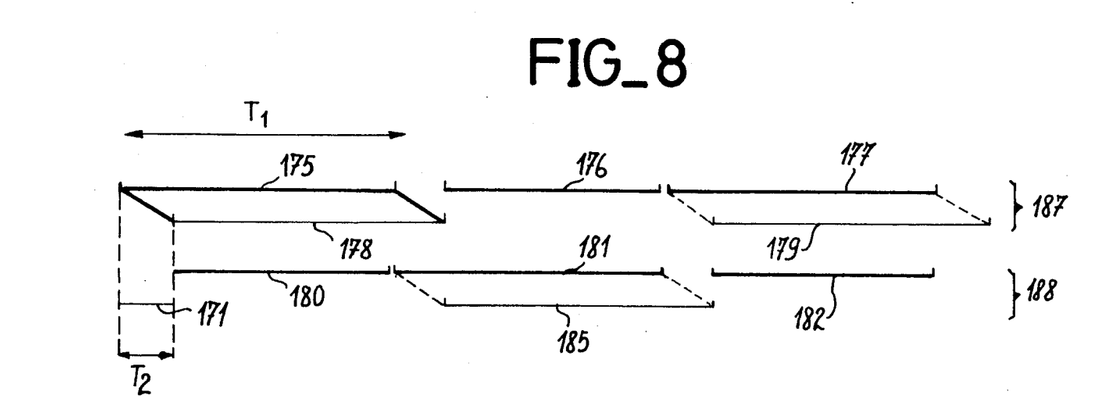
FIG. 8 illustrates the time required for the functions carried out by the memories of the invention.

In FIG. 8 can be seen the evolution in time of the functions carried out by memories 130 and 131. The functions carried out by memory 130 bear the reference 187 and those executed by memory 131 and reference 188. The length T1 corresponds to the calculation time, length T2 corresponds to the pipeline delay of the calculator. A first function for reading a memory 130 bears in the Figure the reference 175 whereas writing bears the reference 178. Simultaneously, memory 131 finishes writing at 171 and begins management of the inputs-outputs at 180. In the next cycle, memory 130 ensures the exchanges with the external memory at 176 i.e. the inputs and outputs. Simultaneously at 181 memory 131 ensures reading out and at 185 writing in. In the next cycle, the rules are reexchanged memory 130 ensures reading at 170 and at 179 writing whereas as memory 131 ensures the inputs and outputs at 182. The succession of the cycles continuing in a similar way is not shown in the Figure.

Figure 9:
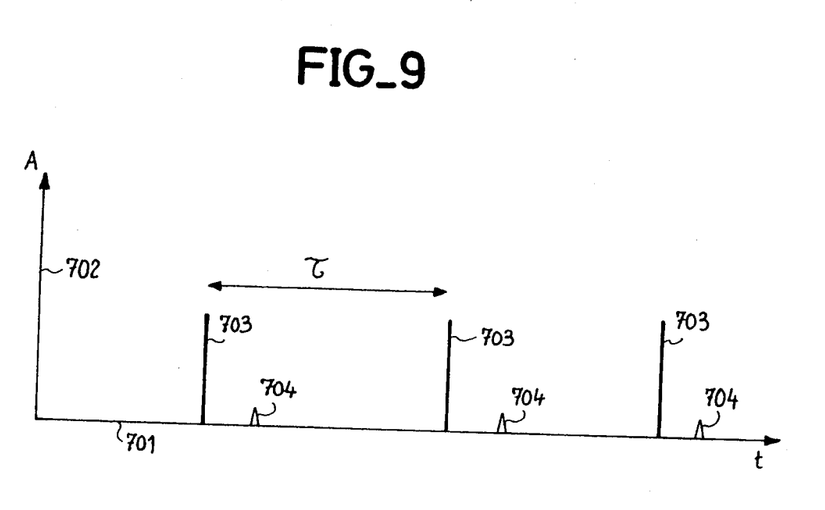
FIG. 9 illustrates a radar spectrum.

The DFT is a mathematical tool for analyzing spectra. In FIG. 9 can be seen a radar spectrum comprising emitted pulses 703 and received echos 704. The straight line 701 represents the time t, the straight line 702 the amplitude of the signal. The spectrum is periodic with a period $\tau$. In radars, it is interesting for example to make correlations between a part of the spectrum and a part of the corresponding spectrum of the following periods. For example, correlation of the amplitude of signal A at time t, $A(t_0)$, with the amplitude $A(t_0+n\tau)$ is calculated, where n is an integer. Such a spectral analysis requires information to be stored over several periods before processing. Advantageously, the digitalized radar signal is stored in a RAM. For processing a signal comprising a great deal of information, the storage capacity of the internal memories 130 and 131 of processor 500 may prove to be insufficient. External RAMs are then associated with processor 500.

Figure 10:
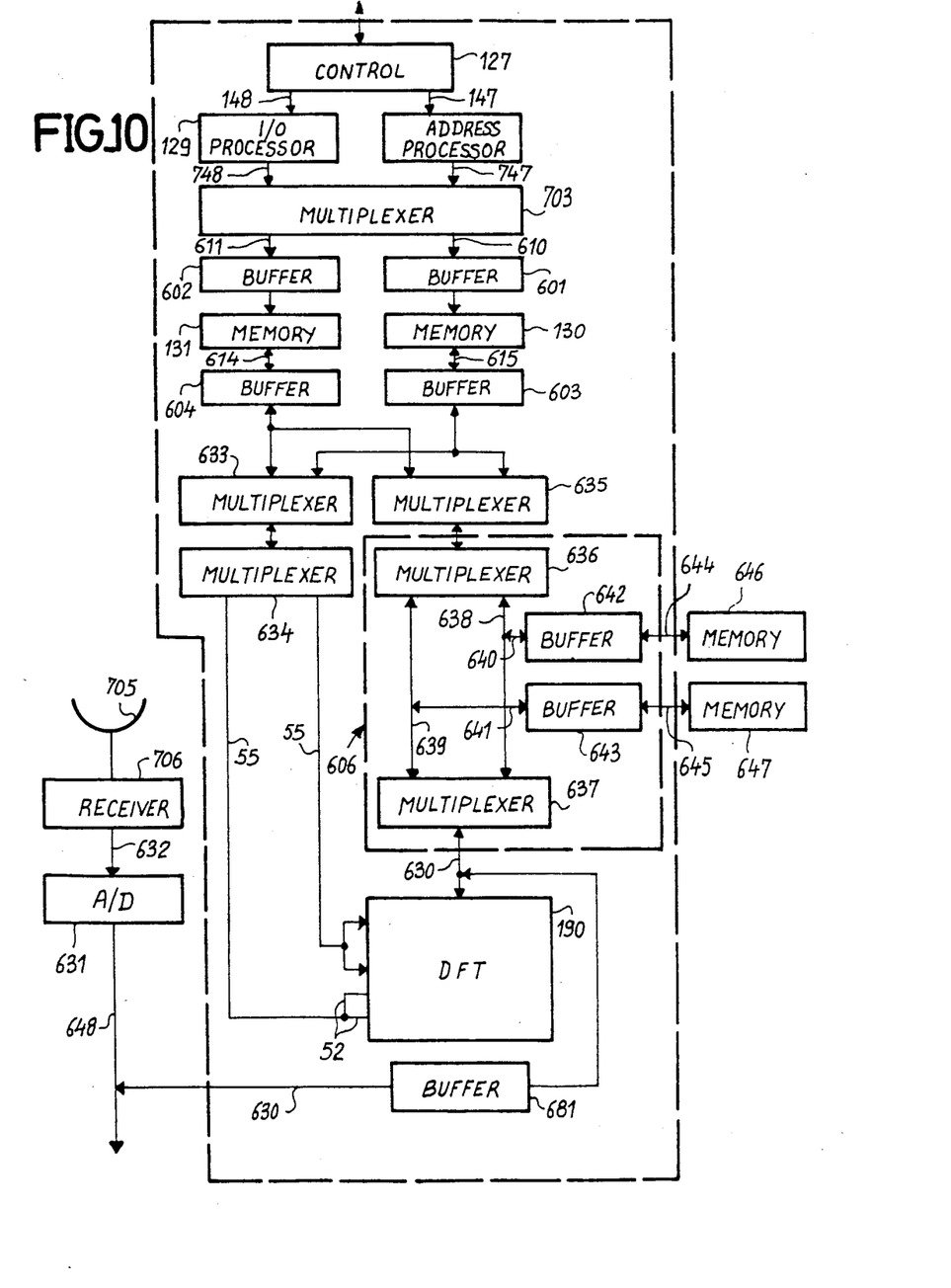
FIG. 10 is a block diagram illustrating data transfer between the external memories and the internal memories used in the invention.
Figure 11:
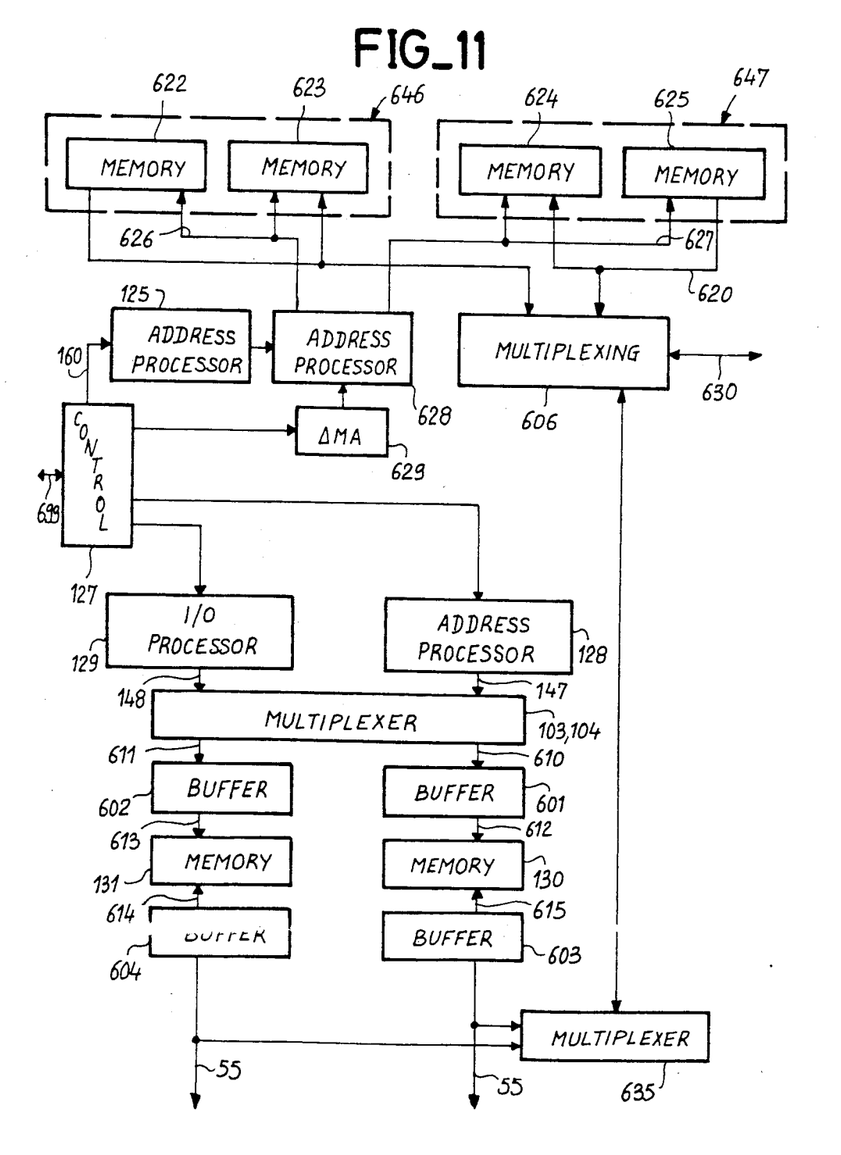
FIG. 11 illustrates the management of the memories of the device of the invention.

Advantageously, processor 500 ensures management of the external memories. Examples of a circuit 500 for managing the external memories are illustrated in FIGS. 10 and 11. In these embodiments, the input/output buses of circuit 500 are used for exchanging data of the external memories without increasing the total calculation time.

In FIG. 10, an embodiment of the device of the invention is shown for providing data transfer between the external memories 646, 647, the internal memories 130 and 131 and the acquisition of data. So as not to overload the Figure control buses have not been shown. Control circuit 127 is connected to the input/output processor 129 and to the address processor 128 by the control buses respectively 148 and 147. The input/output processor 129 is connected to a first input of a multiplexer 703 by an address bus 148. The address processor 128 is connected to a second input of multiplexer 703. A first output of multiplexer 703 is connected to memory 131 through an address bus 611. Advantageously, bus 611 comprises a buffer memory 602 for improving synchronization.

The second output of multiplexer 703 is connected to memory 130 through the bus 610. Advantageously, bus 610 comprises a buffer memory 601 for improving the synchronization.

Memory 130 is connected to first inputs of multiplexers 635 and 633 through a data bus 615. Advantageously the data bus 615 comprises a buffer memory 603 for improving the synchronization. Memory 131 is connected to the second inputs of multiplexers 635 and 633 through a data bus 614.

Advantageously, data bus 614 comprises a buffer memory 604 for improving the synchronization. Multiplexer 633 is connected to a multiplexer 634. Multiplexer 634 is connected by buses 55 to the DFT calculation circuit 190. Multiplexer 635 is connected to a multiplexer 636 of a multiplexing circuit 606. In addition to multiplexer 636, the multiplexing circuit 606 comprises a multiplexer 637 and two buffer memories 642 and 643. The buffer memories 642 and 643 are connected respectively to external memories 646 and 647 by the data buses 644 and 645. The multiplexer 637 is connected to the DFT calculation circuit 190 by a data bus 630. Multiplexers 636 and 637 are connected together by two data buses 638 and 639. The buffer memory 642 is connected to bus 638 by a data bus 640 The buffer memory 643 is connected to bus 639 by a data bus 641.

The data bus 630 is connected to a data bus 648 external to the device of the invention. Advantageously, data bus 630 comprises a buffer memory 681 for improving synchronization. Bus 648 supplies to circuit 500 the data to be processed and transmits the results of the calculation. For example, bus 648 is connected to a data acquisition device connected to an analog-digital converter 631. The data acquisition device is for example a radar antenna 705 associated with a receiver 706.

The multiplexer 703 Is capable of connecting alternately bus 610 to bus 648 and bus 611 to bus 747 or bus 610 to bus 747 and bus 611 to bus 748. Thus memories 130 and 131 play alternately the role of calculation memory or input/output memory. The multiplexers 633 and 634 ensure the two way data exchanges between the calculation memory and the DFT calculation circuit 190.

Simultaneously, multiplexers 635 and 636 ensure the two way data exchanges between the input/output memory and one of the external memories 646 or 647. The buffer memories 642 and 643 improve the data exchange synchronization. The external memory is loaded through a buffer memory 642 or 643, a first bus 640 or 641, a second bus 638 or 639, multiplexer 637, bus 630, buffer memory 681 and bus 648.

In a variant, the buffer memories 61 to 67 of FIGS. 3 to 6 have the storage capacities required for simultaneously storing real and imaginary parts of a complex number. Loading takes place in a clock cycle, whereas the calculations take four clock cycles. During three clock cycles bus 630 is free. Advantageously, the data exchanges between bus 648 and the external memories 646 or 647 take place during the calculation cycles of the processor 190 when bus 630 is left free.

Thus the multiplexing circuit 606 allows the same bus to be used for data exchange between internal memories 130, 131 and external memories 646, 647 and between said external memories and the data acquisition device. Advantageously, the external memory is divided into two parts, memory 646 and memory 647, serving alternately as internal input/output memory or as external input/output memory.

In FIG. 11, the management of the memories of the device of the invention can be seen.

The external memories 646 and 647 are divided into coefficient memories-respectively 622 and 625 and data memories 623 and 624.

The coefficient memories 622 and 625 both contain the same coefficients of the DFT. The data memories 623 and 624 are RAMs.

In a first variant of the device of the invention, the coefficient memories 622 and 625 are ROMs or reprogrammable ROMs (EPROM, EEPROM).

In a second variant of the device of the invention, the coefficient memory 622 and 625 are RAMs loaded from a mass memory (not shown). The control circuit 127 receives the synchronization instructions and pulses over a bus 699. The control circuit 127 manages the internal memories 130 and 131 in a way similar to that shown in FIG. 10. Control circuit 127 is connected by a control bus 160 to an address processor 125 of the DFT coefficient memory. Furthermore, control circuit 127 is connected to a direct memory access processor 629 (DMA). The address processor 125 of the coefficient memory on the one hand and the direct memory access processor 629 on the other are connected by address buses to an external memory address processor 628. The address processor 628 for the external memories is connected to the external memories by a first bus 626 to memory 646 and by a second bus 627 to memory 647. The processors 125, 628 and 629 comprise binary counters and/or "bit reverse" counters. Processors 125 and 629 manage the addresses of the counters stored in the internal memory 646 and 647. The address processor 628 shapes said addresses. Advantageously the addresses of the coefficient memory 622 or 625 and of the data memory 623 or 624 are transmitted in a single word. For example, the address of the coefficient memory 622 or 625 is formed by the most significant bits (MSB) of the address word. The address of the data memory 623 or 624 is formed by the least significant bits (LSB) of the address word.

In one embodiment of the device of the invention, some bits are common to both addresses. For example, for calculating a DFT over 1024 points, external memory address words of 18 bits are used. The eleven most significant bits form the address of the coefficient memory, the eleven least significant bits form the address of the data memory. The multiplexing circuit 606 allows the data stored in the external memory 646 and 647 to be read and the data to be written into the data memories 623 and 624 of said external memories.

In a first stage, the multiplexing circuit transmits the DFT coefficient stored in memory 622 to the multiplexer 41 of FIG. 6 over bus 630.

Simultaneously, the data memory 624 effects an exchange of information with the internal input/output memory, for example memory 131. The calculation memory 130 supplies the data or receives the results of calculation from the DFT calculation circuit 190 over bus 55.

In a second stage, the multiplexing circuit 606 allows exchanges between the data memories 623 and the external bus 648 of FIG. 10 over bus 650.

Simultaneously, data exchanges take place between memory 631 and memory 625. These exchanges consist in transmitting the calculation results of the preceding elementary butterfly followed by loading the data required for the next elementary butterfly.

Similarly, the data memories, for example 625 transmt first of all the results of the preceding DFT calculation then load the data for the next DFT calculation.

With calculation of an elementary butterfly finished, the role of the internal memories 130 and 131 is reversed. For example, memory 131 which plays the role of input/output memory comprises the data required for calculating the next elementary butterfly. Memory 131 becomes the calculation memory. On the other hand, memory 130 contains the stored results from calculating the preceding butterfly. It becomes the input/output memory.

Similarly, at the end of calculating a DFT, the roles of memories 646 and 647 are reversed. Advantageously, the same external memory, for example 646, serves for supplying the DFT coefficient to multiplier 41 of FIG. 10 and for carrying out the external exchanges. Simultaneously, the data memory, for example 624, of the other external memory 647, effects the data exchanges with the internal input/output memory, for example 130. Such grouping ensures the best use of buses 620 and 621. In fact, the exchanges with the internal memory 130 and 131 are more numerous than exchanges between the external memories and bus 648 of FIG. 10.

In one embodiment of the device of the invention intended for calculating the DFT over 1024 points, data bus widths are:

| bus | number of bits |
|---|---|
| 55 | 2 × 48 |
| 620 | 50 |
| 621 | 50 |
| 630 | 48 |
| internal to processor 190 | 24 |

Buses 621 and 620 comprise two parity or error correction bits. In one embodiment of the device of the invention intended for calculating the DFT over 32768 points, the data bus widths are:

| bus | number of bits |
|---|---|
| 55 | 2 × 48 |
| 620 | 50 |
| 621 | 50 |
| 630 | 48 |
| internal to the processor 190 | 24 |

The device of the invention also applies principally to calculating the discrete Fourier transform and to calculating the convolution products.

In a first variant, the device of the invention is in the form of printed circuits. Advantageously, the device of the invention comprises integrated circuits. Advantageously these integrated circuits are made in accordance with gallium arsenide technology providing high processing rates.

In another variant the circuits are constructed in high speed bipolar form, for example as emitter coupled logic (ECL).

In a second variant, the device of the invention is constructed in integrated circuit form. Advantageously, this integrated circuit is constructed in accordance with gallium arsenide technology.

In a variant, the DFT calculation circuit 500 is in the form of a monolithic integrated circuit associated with one or more permanent external memory circuits (ROM) 126. This increases the size of the permanent memory 126 without for all that increasing the surface of the DFT calculation circuit 500. In addition, it is thus possible to change the coefficients, for example of weightings, without modifying the calculation circuit.

Advantageously control device 127 is a programmable logic array (PLA).

What is claimed is:

1. A circuit for calculating the discrete Fourier transform, comprising
   means (190) for providing time discrimination including
   a multiplier (41), having a pair of inputs (53, 107) and an output, and
   a first adder (42) having a pair of inputs, a first one (59) of which is connected to said multiplier output, and a second one (68) of which is connected to a data stream (55) not passing through said multiplier (41), and
   a second adder (43) having a pair of inputs, a first one (56) of which is connected directly to said multiplier output, and a second one (57) of which is connected to a buffer memory (63), said buffer memory (63) being coupled to said multiplier output, said connections of said first and second adders thereby defining a butterfly data stream configuration,
   means (500, 124–131) for breaking up calculation of the transform over N points into a succession of independent Fourier transform calculations over groups of $N_i$ terms, where N is greater than $N_i$, and including address processor means (125,128) for supplying continuous streams of data (51, 100) to said time discrimination means (190).

2. The calculation circuit as claimed in claim 1, wherein discrete Fourier transform groups have the same number of terms.

3. The calculation circuit as claimed in claim 1, comprising at least one random access memory (130, 131) connected to an output of said address processor means (128).

4. The circuit as claimed in claim 3, further comprising an input/output processor managing the data exchanges between an internal memory and an external memory.

5. The circuit as claimed in claim 3, wherein said random access memory is divided into two blocks (130,131) each acting alternately as calculation memory and as input-output memory.

6. The circuit as claimed in claim 5, wherein said circuit is constructed in the form of an integrated circuit.

7. The circuit as claimed in claim 6, wherein said circuit is constructed from gallium arsenide.

8. The circuit as claimed in claim 1, further comprising a permanent memory (126) connected to an output of said address processor means.

9. The circuit as claimed in claim 8, wherein said permanent memory is a read only memory (ROM).

10. The circuit as claimed in claim 9, wherein said permanent memory comprises at least one of a programmable read only memory (PROM), an eraseable programmable read only memory (EPROM), and an electrically eraseable programmable read only memory (EEPROM).

11. The circuit as claimed in claim 1, wherein each of said address processor means (125, 128) comprises a binary counter.

12. The circuit as claimed in claim 1, wherein the address processor means for a coefficient memory generates the same most significant bits for the discrete Fourier transform calculations independently of the number of points.

13. The circuit as claimed in claim 1, further comprising
control means (127) having respective outputs connected to and controlling said address processor means (125,128) and said adders (42, 43), controlling the synchronization of clock signals (162) applied to other circuit elements, and controlling switching (149-161, 163) for carrying out the calculation.

14. The circuit as claimed in claim 1, further comprising a control device (127) which is a programmable logic array (PLA) and has respective outputs connected to and controlling said address processor means (125, 128) and said adders (42, 43).

15. The circuit as claimed in claim 1, wherein said circuit is constructed in the form of at least one integrated circuit.

16. The circuit as claimed in claim 15, wherein said integrated circuit is constructed from gallium arsenide.

17. A circuit for calculating the discrete Fourier transform, comprising
means (190) for providing time discrimination including
a multiplier (41), having a pair of inputs (53, 107) and an output, and
a first adder (42) having a pair of inputs, a first one (59) of which is connected to said multipler output, and a second one (68) of which is connected to a data stream (55) not passing through said multiplier (41), and
a second adder (43) having a pair of inputs, a first one (56) of which is connected directly to said multiplier output, and a second one (57) of which is connected to a buffer memory (63), said buffer memory (63) being coupled to said multiplier output, said connections of said first and second adders thereby defining a butterfly data stream configuration,
means (500, 124-131) for breaking up calculation of the transform over N points into a succession of independent Fourier transform calculations over groups of $N_i$ terms, where N is greater than $N_i$, and including address processor means (125,128) for supplying continuous streams of data (51, 100) to said time discrimination means (190), and
input/output processor means (129), within said breaking up means (124-131), for managing data exchange (100,155) between
an internal memory (130,131) and
an external memory (646,647), and wherein said internal memory is divided into two blocks (130,131) each acting alternately as calculation memory and as input-output memory.

* * * * *